United States Patent [19]

Maeda

[11] Patent Number: 4,652,952

[45] Date of Patent: Mar. 24, 1987

[54] HEAD MOVING DEVICE

[75] Inventor: Masaya Maeda, Kanagawa, Japan

[73] Assignee: Canon Kabushiki Kaisha, Toyko, Japan

[21] Appl. No.: 633,194

[22] Filed: Jul. 23, 1984

[30] Foreign Application Priority Data

Jul. 28, 1983 [JP] Japan .................. 58-138547
Jul. 28, 1983 [JP] Japan .................. 58-138548

[51] Int. Cl.⁴ .................. G11B 5/55; G11B 21/08
[52] U.S. Cl. .................. 360/106; 360/109
[58] Field of Search .................. 360/106, 109, 75, 78

[56] References Cited

U.S. PATENT DOCUMENTS

| 4,005,493 | 1/1977 | Morgan | 360/106 |
| 4,270,155 | 5/1981 | Bejerano | 360/106 |
| 4,428,012 | 1/1984 | Applequist et al. | 360/106 |
| 4,464,689 | 8/1984 | Probst | 360/78 |

Primary Examiner—John H. Wolff
Attorney, Agent, or Firm—Toren, McGeady and Goldberg

[57] ABSTRACT

The disclosed head moving device linearly and intermittently moves a head, such as a recording or reproducing head, a predetermined unit amount. A moving mechanism linearly moves the head in response to the rotation of an output shaft of a motor. A rotation component operatively connected to the output shaft of the motor rotates in response to the rotation of the output shaft so that one revolution of the rotation component corresponds to the predetermined unit amount of movement of the head, and an arresting element arrests the rotation component every revolution.

11 Claims, 5 Drawing Figures

HEAD MOVING DEVICE

BACKGROUND OF THE INVENTION

1. Field of the Invention:

The present invention relates to a head moving device, and more particularly to a head moving device for linearly and intermittently moving a head a predetermined unit amount.

2. Description of the Prior Art:

Various devices have been developed for recording signals along concentric tracks of a disc-shaped rotary recording medium, for reproducing the recorded signals, or for doing both. The medium may be in the form of a magnetic or optical disc such as a floppy disc or video disc. In such devices it is necessary to move a recording or reproducing head intermittently along the radial direction of the record bearing medium, in predetermined discrete amounts, that is, the pitch of the recording tracks on the record bearing medium.

It is essential to position the head correctly in order to record a signal at a predetermined position on the record bearing medium. Such positioning makes the medium interchangeable with other apparatus during recording and allows proper reproduction without track deviation.

A head moving device that linearly moves the head in response to rotation of a motor is normally constructed such that an indexing member rotated by the motor within one revolution over the head's whole range of movement is provided with an arresting element (for example, a click stop element) to arrest the rotated member at each track position of the head. Thus, movement of the head a predetermined amount is controlled by arresting the rotated member in a rotational phase corresponding to each track position of the head.

However, to record signals at, for example, fifty different positions on the recording medium, the indexing member must be correctly arrested in fifty different rotational phases. Therefore, for example, when a click stop element is used as the arresting element, fifty click grooves must be correctly indexed and formed on the indexing rotation member. However, it is very difficult in practice to index and form this many click grooves correctly. First, it is impossible to move the head by a predetermined unitary amount with high precision due to inferior indexing accuracy. Further, the indexing rotation member is very expensive and its dimension or diameter must be unavoidably large to obtain high accuracy. This is quite inconvenient.

Also, this kind of device has to be provided with a mechanism for adjusting the head position on the record bearing medium.

The most conventional head adjusting mechanism positions the head by adjusting the position of the head relative to a head carriage which supports the head. However, in order to realize this effect, the construction for producing the position adjustment becomes large and complicated, the contact of the head with the medium is at times inferior, and the part to be adjusted is very close to the head, so that the danger of damaging the head during adjustment is high, while complicated and inconvenient handling is necessary.

SUMMARY OF THE INVENTION

It is, accordingly, an object of the present invention to provide a novel head moving device capable of positioning a head on a record bearing medium correctly.

It is another object of the present invention to provide a compact and economical head moving device for linearly and intermittently moving the head, whereby intermittent movement of the head by a predetermined unit amount can be obtained very precisely, while indexing means does not need such high precision.

To achieve these objects, according to a preferred embodiment of the present invention, a head moving device for linearly and intermittently moving a head by a predetermined unit amount includes: a motor having a rotatable output shaft; a moving mechanism for linearly moving the head in response to the rotation of the output shaft of the motor; a rotation device operatively connected to the output shaft of the motor and arranged to rotate in response to the rotation of the output shaft so that one revolution of the rotation device corresponds to the predetermined unit amount of movement of the head; and arresting element for arresting the rotation device every one revolution thereof.

It is still another object of the present invention to provide a novel head moving device having a very simple head position adjusting construction for linearly moving the head by the rotation of a motor without complicated handling, whereby position of the head can be adjusted correctly without damaging the contact state between the head and a record bearing medium and thereby damaging the head.

To achieve these objects, according to a preferred embodiment of the present invention, a head moving device is constructed with a first rotation shaft having a worm wheel; a moving element operatively connected to the first rotation shaft for linearly moving the head in response to the rotation of the first rotation shaft; a second rotation shaft having a worm gear engaged with the first rotation shaft worm wheel and arranged in crossing relation with the first rotation shaft in a rotatable and axially slidable manner; a motor for rotating the second rotation shaft; and an adjusting element for adjusting the second rotation shaft in its axial direction.

Further objects and features of the present invention will be apparent from the following description of preferred embodiments with reference to the accompanying drawings.

BRIEF DESCRIPTION OF THE DRAWINGS

Embodiments of the present invention will be described below with reference to the accompanying drawings, in which.

DETAILED DESCRIPTION OF THE PREFERRED EMBODIMENTS

Figure 1:
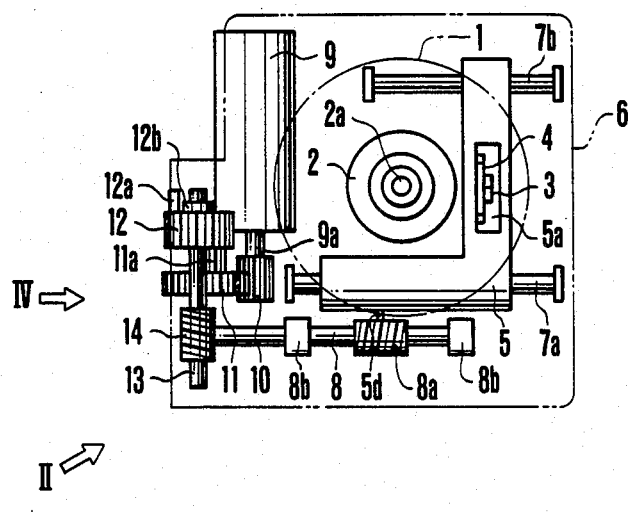
FIG. 1 is a plan view showing an embodiment of the present invention.
Figure 2:
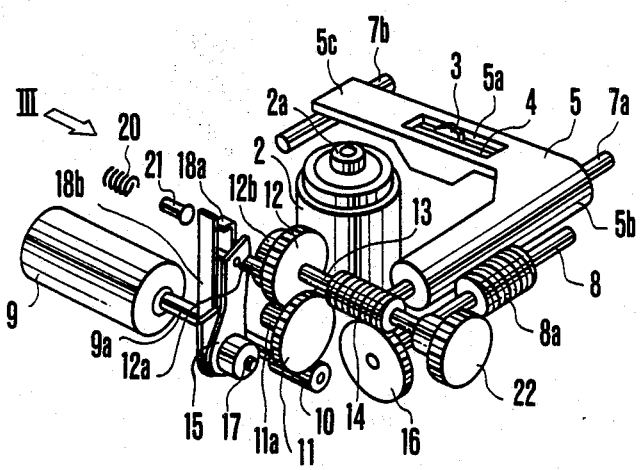
FIG. 2 is a perspective view of FIG. 1 in the direction II.

In FIGS. 1 and 2, 1 is a flexible magnetic disc as, i.e., a disc-shaped rotary record bearing medium, and 2 is a disc rotating motor for rotating the disc at a predetermined speed of revolution. Motor 2 has a spindle 2a on which is mounted a center core provided at the center of the magnetic disc 1. A magnetic head 3 for recording and/or reproducing a signal is supported on a support plate 4 mounted in an opening 5a of a head carriage 5. Cylindrical part 5b of carriage 5 is slidably mounted on a first guide rod 7a secured on a main body chassis 6, while lever part 5c on the opposite side of the head carriage 5 is kept in contact with a second guide rod 7b secured on the main body chassis 6 in parallel with the first guide rod 7a. A screw shaft 8 is mounted close to the cylindrical part 5b of head carriage 5 in parrallel therewith. Screw shaft 8 has a screw 8a with a lead for moving the carriage 5 and is supported by bearings 8b on the main body chassis 6. A projection 5d is provided on the side surface of the cylindrical part 5b of carriage 5 so as to engage the screw 8a. Projection 5d engages screw 8a. A head moving motor 9 is secured on the main body chassis 6 and has an output shaft 9a with a pinion gear 10. The pinion gear 10 is engaged with an intermediate gear 11. A pinion gear 11a is attached to the intermediate gear 11 and engages a click gear 12 acting as a rotation member for indexing head position. The click gear 12 is fixedly attached to a shaft 13 supported by bearings 19 (FIG. 4) on the main body chassis 6, while the shaft 13 crosses the screw shaft 8 and is provided with a worm gear 14. The worm gear 14 engages a worm wheel 16 mounted at the end of the screw shaft 8. Consequently, the rotation of the motor 9 is reduced via the route 10-11-11a-12-14-16, transmitted to the screw shaft 8, and then converted into a linear movement by the engagement of the screw 8a with the projection 5d and transmitted to the head carriage 5. The screw 8a and the carriage 5 are essential to the mechanism for linearly moving the head 3.

The reduction ratio of the above gear train is selected so that the head carriage 5 moves on the magnetic disc 1 by one track pitch for one revolution of the click gear 12, namely, one revolution of the worm gear 14. Click gear 12 has an engaging pin 12a, which is arranged to be arrested by a click arm 15 (FIG. 2). Click arm 15 acts as an arresting element.

Figure 3:
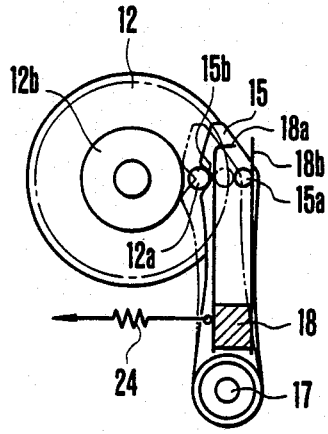
FIG. 3 is an enlarged perspective view of FIG. 2 in the direction III.

As shown in FIG. 3 in enlargement, the click arm 15 has a notch 15b for engaging the pin 12a, is rotatably supported on a shaft 17 secured to the main body chassis 6, and is urged by a spring 24 in the counterclockwise direction in FIG. 3, namely, in the direction in which the arm 15 is to engages the pin 12a. Further, the click arm 15 is provided with a pin 15a extending in the middle between two contacts 18a and 18b of a normally close leaf switch 18. Contacts 18a and 18b are normally kept in contact with each other by the force of elasticity of the contact 18b. When the engaging pin 12a of click gear 12 is arrested by the notch 15b of the click arm 15, the pin 15a separates the contact 18b from the contact 18a. As click gear 12 rotates and the pin 12a disengages notch 15b, the click arm 15 turns by the force of the spring 24 in the counterclockwise direction in the drawing, as shown by the two dot line of FIG. 3, and keeps in contact with a boss 12b of the click gear 12.

Figure 4:
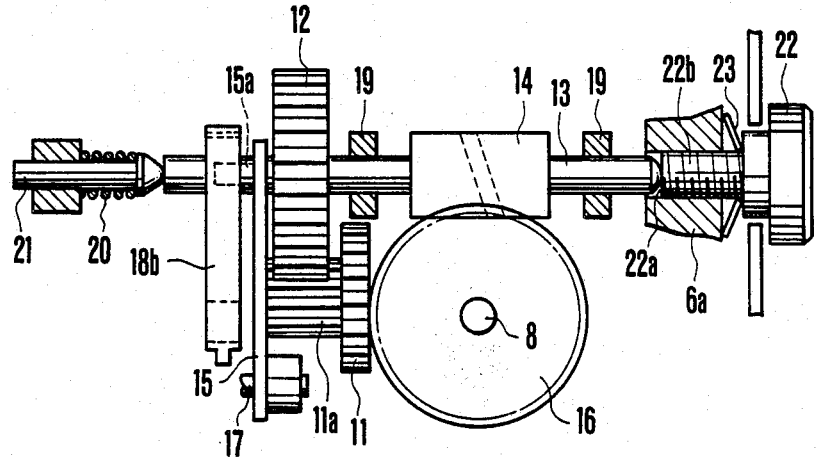
FIG. 4 is a partially enlarged perspective view of FIG. 1 in the direction IV.

As shown in FIG. 4, the shaft 13 having the click gear 12 and the worm gear 14 is rotatably supported on bearings 19 provided on a part of the main body chassis 6 so as to be slidable in its axial direction, and is pushed at its end to the right by the head of thrust pin 21 urged to the right by a spring 20. Against this pushing force, end 22a of a tracking dial 22 abuts so as the opposite end of the shaft 13 so as to position the shaft 13 in the thrust direction. A male screw is formed on a shaft part 22b of the tracking dial 22 to engage a female screw 6a formed on a part of the main body chassis 6. Proper friction opposing the rotation of the tracking dial 22 is produced by the elastic force of a spring washer 23. This friction is selected in such a range that even if, as stated above, at the time of the intermittent movement of the head 3, the shaft 13 rotates, the dial 22 does not rotate because of the friction at the contact part of the tracking dial 22 with the shaft 13.

Figure 5:
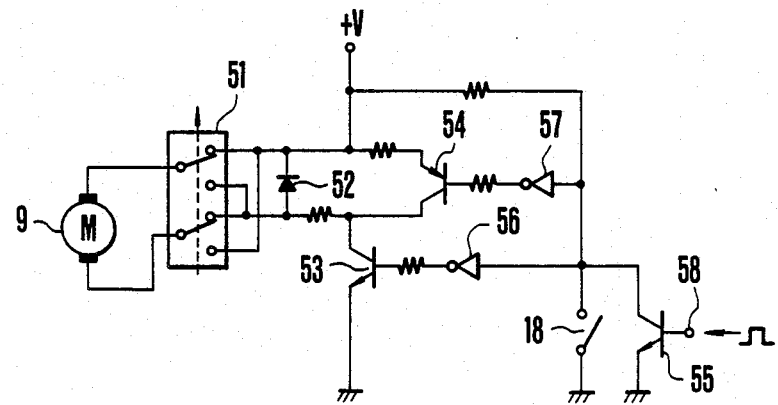
FIG. 5 is a motor control circuit.

FIG. 5 shows a driving circuit associated with the head moving motor 9, in which 51 is a switch for changing the direction of rotation of the motor 9, 52 is a diode, 53, 54 and 55 are switching transistors, 56 and 57 are inverters, and 18 is the leaf switch.

The operation of the above-described head moving device is as follows.

In FIG. 5, a trigger pulse for intermittently moving the head 3 is supplied to an input terminal 58 connected to the base of transistor 55. This trigger pulse has a predetermined width of positive polarity, as shown in FIG. 5, and is supplied to move head 3 by one track pitch at the time of recording or reproduction. While this pulse is high, the transistor 55 is turned on. Accordingly, the transistors 53 and 54 are turned on and off through the inverters 56 and 57, respectively, and current then flows through the motor 9, in the direction determined by switch 51, from a terminal +V of electric power source. The switch 51 determines the direction of the rotation of the motor 9, namely, that of the movement of the head 3. When the motor 9 is started, as mentioned above, the click gear 12 rotates via the pinion gear 10, the intermediate gear 11 and the pinion gear 11a. In FIG. 3, along with the rotation of the click gear 12, the engaging pin 12a is disengaged from the notch 15b of the click arm 15. Click arm 15 turns counterclockwise, as shown in the dotted line in FIG. 3, and the contact 18b of the leaf switch 18, being released from the pressure of pin 15a, comes into contact with the contact 18a because of its elasticity. The width of the trigger pulse is selected to guarantee the time during which the engaging pin 12a is disengaged from the notch 15b of the click arm 15 against the force of the spring 24. When leaf switch 18 is thus turned on, the transistor 53 is kept on, and while the transistor 53 is on, motor 9 continues to run. When the engaging pin 12a of click gear 12 again comes to the position facing notch 15b of click arm 15, the click arm 15 is urged by engaging pin 12a to turn clockwise against the force of spring 24 until the engaging pin 12a again engages notch 15b of the click arm 15. At this time, the contact 18b is separated from contact 18a by pin 15a. Thus, transistor 53 is turned off to cut off the current supply to motor 9, while the transistor 54 is turned on to short-circuit both terminals of the motor 9. The motor 9 thus brakes. As click gear 12 thus rotates one revolution, the head 3 is moved by one track pitch relative to the disc 1 because one revolution of the click gear 12 corresponds to the movement by one track pitch of the head carriage 5.

When the recorded disc 1 is reproduced, it is often difficult to guarantee completely accurate positioning of the head 3 relative to a recording track by such a step moving mechanism as mentioned above because of the shrinkage of the magnetic disc 1 and the mechanism system caused by either the temperature and the humidity difference at the time of recording and reproduction or the uneven accuracy among the members. In such a case, it is possible to carry out a so-called tracking adjustment in such a manner that, by rotating the tracking dial 22, the worm gear 14 moves in the axial direction of the shaft 13 to rotate the worm wheel 16. The phase of the worm wheel 16 is thus changed relative to engaging pin 12a of the click gear 12 arrested by the notch 15b of the click arm 15 to change the position of head 3. In this case, the fear of damage to head 3 is completely eliminated because the position of head 3 is adjusted at a position very far from the head 3, while the head touch is not damaged. Handling is easy because the head 3 is moved with the head carriage 5.

It goes without saying that the above-mentioned construction is effective not only for the tracking at the time of the signal reproduction but also for the adjustment of the standard position of the head 3 at the time of the production of a recording and/or reproducing apparatus.

As described in detail, according to the present invention, in a head moving device for linearly and intermittently moving a head by a predetermined unit amount, the intermittent movement of the head by the predetermined unit amount is performed very accurately, while index means does not need such high accuracy, so that a compact and economical head moving device is realized, which is remarkably advantageous.

Further, according to the present invention, in a head moving device for linearly moving a head by rotation of a motor, no complicated handling or construction are necessary, whereby the head touch is not damaged, while the position of the head is adjusted correctly without danger of damaging the head, which is remarkably advantageous for this kind of device.

The disclosed embodiment describes a case where the present invention is applied to a head moving device for a magnetic recording and/or reproducing apparatus in which a magnetic disc is used. However, it goes without saying that the present invention is not limited to such an embodiment. For example, the record bearing medium could be a magnetic drum. The present invention can also be applied to a head moving device for an optical disc recording and/or reproducing apparatus in which an optical disc is used as the record bearing medium. Further, the present invention can be applied to a print head moving device for a printer.

What I claim:

1. A device for linearly and intermittently moving a head by predetermined unitary amounts, comprising:
   (A) a motor having a rotatable output shaft;
   (B) a moving mechanism for linearly moving the head in response to the rotation of said output shaft of the motor, said moving mechanism including a first rotation shaft having a worm wheel; moving means operatively connected to said first rotation shaft for linearly moving the head in response to the rotation of the first rotation shaft; and a second rotation shaft having a worm gear engaged with said worm wheel, said second rotation shaft being arranged in crossing relation with said first rotation shaft and operatively connected to the output shaft of the motor;
   (C) rotation means operatively connected to said output shaft of the motor to rotate in response to the rotation of the output shaft so that one revolution of the rotation means corresponds to said predetermined unitary amount of movement of the head; and
   (D) arresting means for arresting said rotation means every single revolution thereof.

2. The device according to claim 1, wherein said rotation means is fixedly attached to said second rotation shaft.

3. The device according to claim 1, further comprising:
   adjusting means for adjusting said second rotation shaft in its axial direction.

4. The device according to claim 1, wherein said moving means includes:
   a screw member fixedly provided on said first rotation shaft;
   a head carriage carrying the head and having an engaging member engaged with said screw member; and
   a guide member for linearly guiding said head carriage along the first rotation shaft.

5. A recording and/or reproducing apparatus arranged to use a rotary type record bearing medium, comprising:
   (A) a transducing head for recording signals on and/or reproducing recorded signals from the medium;
   (B) a first motor for rotating the medium relative to said head;
   (C) a moving mechanism for linearly moving said head along a recording surface of the medium, said moving mechanism including a first rotation shaft having a worm wheel; moving means operatively connected to said first rotation shaft for linearly moving the head in response to the rotation of the first rotation shaft; a second rotation shaft having a worm gear engaged with said worm wheel, said second rotation shaft being arranged in crossing relation with said first rotation shaft; said second motor being arranged to drive said second rotation shaft; and said rotation member being fixedly attached to said second rotation shaft;
   (D) a second motor for driving said moving mechanism;
   (E) a rotatable member operatively connected to a portion of said moving mechanism so that one revolution of the rotatable member corresponds to a predetermined amount of movement of said head effected by the moving mechanism; and
   (F) arresting means for arresting said rotatable member every one revolution thereof.

6. The apparatus according to claim 5, further comprising:
   adjusting means for adjusting said second rotation shaft in its axial direction.

7. The apparatus according to claim 5, wherein said moving means includes:
   a screw member fixedly provided on said first rotation shaft;
   a head carriage carrying the head and having an engaging member engaged with said screw member; and
   a guide member for linearly guiding said head carriage along the first rotation shaft.

8. A device for linearly moving a head, comprising:
   (A) a first rotation shaft having a worm wheel;
   (B) moving means operatively connected to said first rotation shaft for linearly moving the head in response to the rotation of the first rotation shaft;
   (C) a second rotation shaft having a worm gear engaged with said worm wheel, said second rotation shaft being arranged in crossing relation with said first rotation shaft;

(D) a motor for driving said second rotation shaft; and (E) adjusting means for adjusting said second rotation shaft in its axial direction.

9. The device according to claim 8, wherein said moving means includes:
   a screw member fixedly provided on said first rotation shaft;
   a head carriage carrying the head and having an engaging member engaged with said screw member; and
   a guide member for linearly guiding said head carriage along the first rotation shaft.

10. A recording and/or reproducing apparatus arranged to use a rotary type record bearing medium, comprising:
    (A) a transducing head for recording signals on and/or reproducing recorded signals from the medium;
    (B) a first motor for rotating the medium relative to said head;
    (C) a first rotation shaft having a worm wheel;
    (D) moving means operatively connected to said first rotation shaft for linearly moving the head in response to the rotation of the first rotation shaft;
    (E) a second rotation shaft having a worm gear engaged with said worm wheel, said second rotation shaft being arranged in crossing relation with said first rotation shaft;
    (F) a second motor for driving said second rotation shaft; and
    (G) adjusting means for adjusting said second rotation shaft in its axial direction.

11. The apparatus according to claim 10, wherein said moving means includes:
    a screw member fixedly provided on said first rotation shaft;
    a head carriage carrying the head and having an engaging member engaged with said screw member; and
    a guide member for linearly guiding said head carriage along the first rotation shaft.

* * * * *